UNITED STATES PATENT OFFICE.

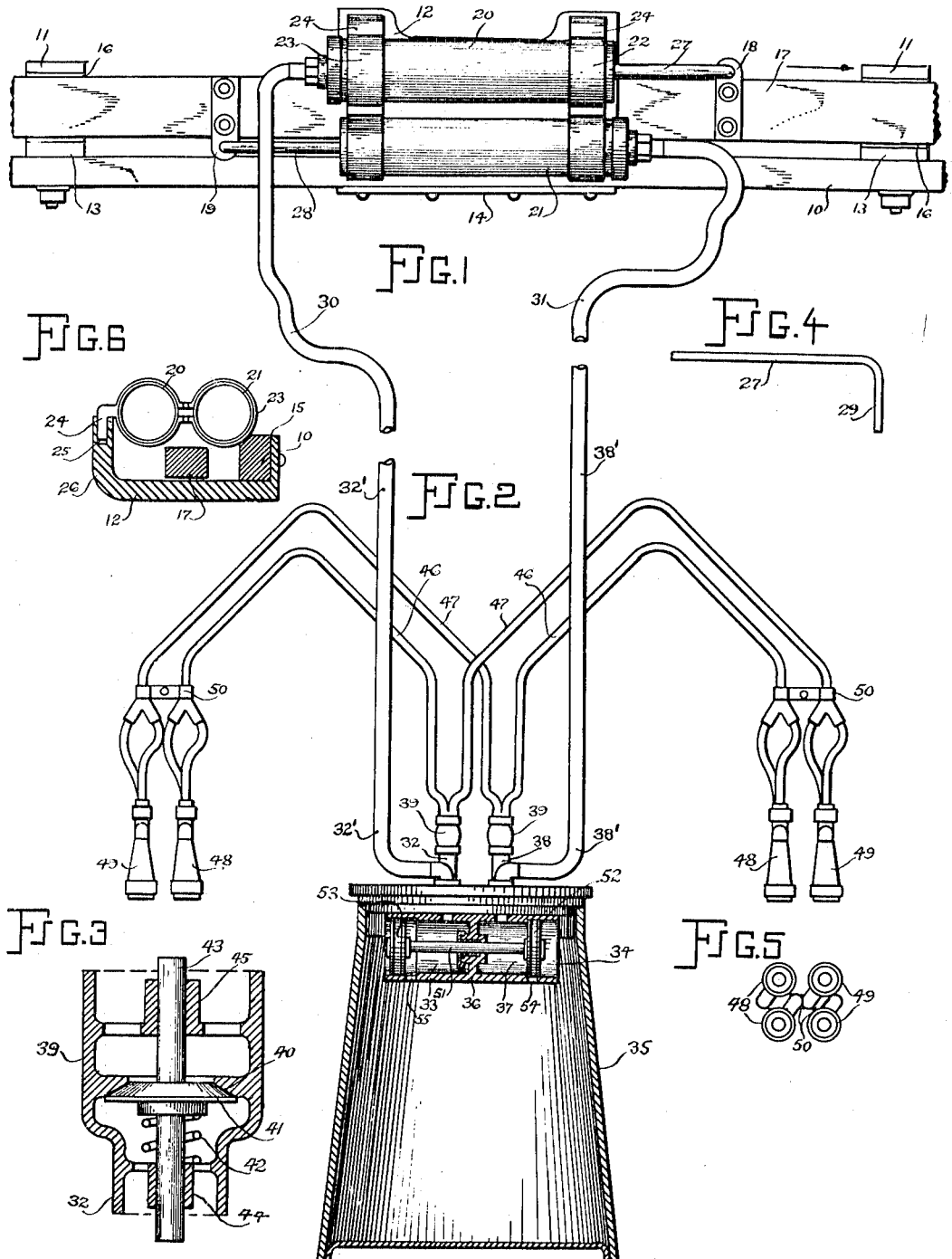

KENNETH K. McLEOD, OF ST. PAUL, MINNESOTA.

MILKING-MACHINE.

1,120,072. Specification of Letters Patent. Patented Dec. 8, 1914.

Application filed May 16, 1914. Serial No. 838,982.

*To all whom it may concern:*

Be it known that I, KENNETH K. MCLEOD, a citizen of the United States, residing at St. Paul, in the county of Ramsey and State of Minnesota, have invented certain new and useful Improvements in Milking-Machines, of which the following is a specification.

My invention relates to milking machines of the suction type, and has for its object to provide such a machine wherein the pumping members shall be readily interchangeable from one set of cows to another, and consequently only very short milking tubes will be required.

As at present constructed, suctional milking machinery comprises a system of extended pipes and a single fixed pumping member producing the suction and pulsation throughout the entire system of piping.

In the machine of my invention the pumping unit is self contained and readily detachable from the power member, a reciprocating rod, and may be set up between any pair of cows. The milking tubes are only sufficiently long so that they will extend from the milk receptacle (usually placed between the cows toward the front thereof) to the udders of the adjacent pairs of cows. Furthermore, my pumping member comprises double sets of pumping units and a correlated double-acting milk disposing chamber so that the pumping action is in all respects double-acting.

The full objects and advantages of my invention will appear in connection with the detailed description thereof and are particularly pointed out in the claims.

In the drawings, illustrating the application of my invention in one form,—Figure 1 is a plan view of a portion of the power member or driving rod and one of the pumping units applied thereto. Fig. 2 is a sectional elevation view of the milk disposing machine and receptacle showing its relation to the pumping mechanism of Fig. 1. Fig. 3 is a sectional view of a valve head of the milking machine. Fig. 4 is a detail view of a connecting rod member. Fig. 5 is a plan view of the milking cups. Fig. 6 is a part sectional view showing the manner of supporting the pumping cylinders when in pumping position.

To a beam 10 extending along the ceiling of the barn or milking room above the forward parts of the cows I secure a series of short open-topped brackets 11 and intermediate brackets 12, all of said brackets preferably being bolted directly to the beam 10, either inside of the beam, as indicated at 13 in Fig. 1, or by a flange 14 bolted to the outside of the beam, as indicated at 15 in Fig. 6. Resting upon brackets 11 and 12 and guided in ways 16 formed in brackets 13 is an extended reciprocal rod or bar 17, which rod is connected for endwise reciprocation, as shown by arrow in Fig. 1, in such guides by any known motor or prime moving mechanism. It is to be noted that the bar 17 extends and reciprocates throughout its extent entirely across the barn or milking room above the forward portion of all of the cows that may be stalled in a row across the room. Between each alternate pair of cows one of the brackets 12 is secured, and connected to bar 17 at one side of bracket 12 is a piece 18 pointing forwardly, a similar piece 19 pointing rearwardly being secured to bar 17 at the other side of the bracket 12.

My pump comprises a pair of cylinders 20, 21 held in fixed parallel relation by means of double ring clamps 22 and 23. Each of these ring clamps is provided with a hook member 24 adapted to seat in a pocket 25 formed in an upstanding flange member 26 of the bracket 12. In putting the pump into operative position, it is only necessary therefore to insert the hooks 24 within the sockets 25. The portions of rings 22 and 23 clasping the outer cylinder 21 are then rested upon the beam 10 and the pumping cylinder will be fixedly held in proper position for operation relative to a pair of cows. Each of cylinders 20 and 21 is provided with a piston rod 27 and 28, respectively. This piston rod, as best shown in Fig. 4, is provided with a transversely bent end 29 which is adapted to be extended through the aperture in the pieces 18 or 19, thereby connecting the pistons with reciprocating bar 17 for pumping operation. As brackets 12 and piston connectors 18 and 19 are provided along bar 17 between each alternate pair of cows, it will be seen that the pumping unit is readily interchangeable for operation upon different sets of cows. Each of cylinders 20 and 21 is open at one end, is provided with a closed piston and employs no valves. To the closed end of cylinder 20 is connected a pipe 30, a similar pipe 31 being connected to the closed end of cylinder 21. The pipe 30 communicates with a pipe 32' which opens downwardly into a chamber 33 formed in a cylindrical casing 34 supported from the top closure of a receptacle 35. The casing 34 is divided at its central portion by a partition 36 forming an additional chamber 37 into which a standpipe 38' discharges, standpipe 38' being connected with pipe 31. Each of the standpipes 32 and 38, which also discharge into the chambers aforesaid, is provided with a valve casing 39 which, as shown in Fig. 3, comprises a valve seat 40 against which a downwardly opening valve 41 is held by a spring 42, said valve being guided by a spindle 43 operating in guides 44 and 45 in the valve casing 39.

Each of the chambers 33 and 37 has a pair of milking tubes 46 and 47 connected therewith by attachment to the upper end of valve casing 39. Each of the tubes 46 is connected with a pair of teat cups 48, while each of the tubes 47 is connected with a pair of teat cups 49. Tubes 46 and 47 extend from each of the chambers 33 and 37 and are carried in the same direction, and the teat cups 48 and 49 connected therewith are united by a central support 50, as best shown in Fig. 5, thus giving a grip to four teat cups adapted to be simultaneously applied to the four teats of one cow's udder or to two teats each of two cows' udders. Since there are two of these groups of quadruple teat cups, it is evident that the machine as illustrated and described can be applied to the simultaneous milking of a pair of cows.

Journaled to slide in the partition 36 is a rod 51 having thereon a pair of pistons 52 and 53, respectively, piston 52 operating in chamber 37 and piston 53 operating in chamber 33. A discharge opening 54 is formed in the bottom of casing 34 from chamber 37 while a similar discharge opening 55 opens from chamber 33. The double piston 52, 53 is adapted to be alternately operated in opposite directions so that the openings 54 and 55 will be successively opened and closed.

The operation of my milking machine is as follows. The bar 17 in its motion back and forth may be said to be traveling in the direction of the arrow, in which event suction is operating through pipe 30, and this suction is applied through chamber 33 and pipes 46 and 47 to teat cups 48 and 49 upon a pair of teats of each of the two cows to draw milk therefrom into said cups and pipes and hence to said chamber. At the same time air is being forced through pipe 31 into chamber 37 inside of piston 52, resulting in closing the check valve 41 in standpipe 38 and forcing piston 32 to the right so as to uncover opening 54 and discharge milk through said opening into receptacle 35. Upon the reverse movement of bar 17 suction is applied to pipe 31 which, through its milking tubes 46 and 47 and the other teat cups 48 and 49, withdraws milk from the other pair of teats of each cow. Air is then forced through pipe 30 closing check valve in standpipe 32 and forcing piston 53 to the left, thereby closing port 54 and opening port 55 to permit discharge of milk previously drawn through the movement of the parts in the opposite direction. This action will be repeated indefinitely until all of the milk of the cow or cows has been withdrawn and discharged into receptacle 35. The pumping members and the receptacle will then be transferred to another station, the cylinders 20 and 21 positioned upon a bracket 12 and the pistons 27 and 28 connected with pieces 18 and 19 and the operation repeated. When all of the cows have been milked, the pump will be disconnected from the various tubes which preferably will be of flexible material, and said tubes cleaned and immersed in an antiseptic solution until needed for another milking, in any of the well known manners.

I claim:

1. A milking machine comprising a reciprocating shaft, a pair of oppositely disposed pump cylinders, means for removably connecting the pistons of said pumps with said shaft and for removably supporting said cylinders, and suction milking mechanism connected with and operated by both of said pumps.

2. A milking machine comprising a reciprocating shaft extending across the barn above a row of cows and supported from a beam of the barn by a series of brackets, some of said brackets having socketed extensions in the plane of said beam, a pair of pump cylinders, means connecting said cylinders in fixed relation including hooks adapted to engage within said sockets whereby the pump cylinders are removably positioned relative to said shaft, oppositely disposed connector pieces upon said shaft, hook-like piston rods engaging said connector pieces, and suction milking mechanism connected with and operated by both of said pumps.

3. A milking machine comprising a pair of oppositely disposed valveless pulsator pumps, means for operating both said pumps simultaneously, and suction milking mechanism comprising a four-teat unit operative on a single cow connected with and operated by both of said pumps.

4. A milking machine comprising a pair of valveless pulsator pumps, means for operating both said pumps simultaneously, a milk-receiving receptacle having a valve chamber divided into two compartments, connections from each of said pumps to a corresponding one of said compartments, suction milking mechanism connected with the respective compartments and operated by the pumps, and means in said valve chamber for permitting alternate discharge of milk from said compartments.

5. A milking machine comprising a pair of oppositely disposed valveless pulsator pumps, means for operating both said pumps simultaneously, a milk-receiving receptacle having a valve chamber divided into two compartments, connections from each of said pumps to a corresponding one of said compartments, suction milking mechanism connected with the respective compartments and operated by the pumps, said valve chamber having a discharge port from each of said compartments, and a unitary valve member having a portion in each of said compartments and operated by the pumps for opening and closing successively said discharge ports.

6. A milking machine comprising a pair of oppositely disposed valveless pulsator pumps, means for operating both said pumps simultaneously, a milk-receiving receptacle having a valve chamber, said chamber being cylindrical and being divided into two separated compartments and each compartment having a discharge port, connections from each of said pumps to a corresponding one of said compartments, suction milking mechanism connected with the respective compartments and operated by the pumps, and a unitary valve member having a piston in each of said compartments and operated by the pumps for opening and closing successively said discharge ports.

7. A milking machine comprising a pair of oppositely disposed valveless pulsator pumps, means for operating both said pumps simultaneously, a milk-receiving receptacle having a valve chamber divided into two compartments, a standpipe connected with each of said compartments, each of said compartments being connected with one of the pumps, an outwardly closing valve in each of said standpipes, suction milking mechanism connected with the said standpipes above said valves, and means in said valve chamber for permitting alternate discharge of milk from said compartments.

8. A milking machine comprising a pair of oppositely disposed valveless pulsator pumps, means for operating both said pumps simultaneously, a milk-receiving receptacle having a valve chamber divided into two compartments, connections from each of said pumps to a corresponding one of said compartments, suction milking mechanism comprising two groups of four teat cups, some of the cups of each group being connected with each of said compartments and operated by both pumps, and means in said valve chamber for permitting alternate discharge of milk from said compartments.

9. A milking machine comprising a pair of valveless pulsator pumps, means for operating both said pumps simultaneously, and suction milking mechanism including two pairs of teat cups for application to one cow, the pairs of teat cups being connected with and operated by corresponding pumps.

10. A milking machine comprising a pair of valveless pulsator pumps, means for operating both said pumps simultaneously, suction milking mechanism including two pairs of teat cups for application to one cow, the pairs of teat cups being connected with and operated by corresponding pumps, and a unitary valve member operated by both pumps for regulating the discharge of milk from the respective pairs of teat cups.

In testimony whereof I affix my signature in presence of two witnesses.

KENNETH K. McLEOD.

Witnesses:
F. A. WHITELEY,
H. A. BOWMAN.